United States Patent
Meusburger

(10) Patent No.: US 11,147,374 B2
(45) Date of Patent: Oct. 19, 2021

(54) DRAWER PULL-OUT GUIDE

(71) Applicant: Julius Blum GmbH, Hoechst (AT)

(72) Inventor: Marc Meusburger, Egg (AT)

(73) Assignee: JULIUS BLUM GMBH, Hoechst (AT)

(*) Notice: Subject to any disclaimer, the term of this patent is extended or adjusted under 35 U.S.C. 154(b) by 0 days.

(21) Appl. No.: 16/799,146

(22) Filed: Feb. 24, 2020

(65) Prior Publication Data

US 2020/0187649 A1    Jun. 18, 2020

Related U.S. Application Data

(63) Continuation of application No. PCT/AT2018/060153, filed on Jul. 18, 2018.

(30) Foreign Application Priority Data

Aug. 30, 2017   (AT) .............................. A 50725/2017

(51) Int. Cl.
*A47B 88/493* (2017.01)
*A47B 88/437* (2017.01)

(52) U.S. Cl.
CPC .......... *A47B 88/493* (2017.01); *A47B 88/437* (2017.01)

(58) Field of Classification Search
CPC ...... A47B 88/40; A47B 88/437; A47B 88/493
USPC ..... 312/330.1, 334.1, 334.8, 334.12, 334.18, 312/334.39
See application file for complete search history.

(56) References Cited

U.S. PATENT DOCUMENTS

| | | | |
|---|---|---|---|
| 4,255,002 A | * | 3/1981 | Rock .................... A47B 88/493 384/19 |
| 4,351,575 A | | 9/1982 | Röck et al. |
| 4,445,726 A | | 5/1984 | Röck et al. |
| 4,659,237 A | | 4/1987 | Rapp |

(Continued)

FOREIGN PATENT DOCUMENTS

| AT | 387 897 B | 3/1989 |
|---|---|---|
| CN | 101313808 | 12/2008 |

(Continued)

OTHER PUBLICATIONS

Office Action dated Dec. 2, 2020 in Chinese Patent Application No. 201880056089.X.

(Continued)

*Primary Examiner* — James O Hansen
(74) *Attorney, Agent, or Firm* — Wenderoth, Lind & Ponack, L.L.P.

(57) ABSTRACT

A drawer pull-out guide includes a first guide rail, a second guide rail displaceably supported relative to one another, and a running carriage having load-transmitting rolling bodies displaceably arranged between the first guide rail and the second guide rail. The running carriage includes at least two rolling bodies rotatable about a rotational axis, and the at least two rolling bodies—in a view onto a plane perpendicular to a longitudinal direction of the guide rails—are arranged so as to be laterally offset to one another. Each of the at least two rolling bodies has a cylindrical form and is rotationally supported about a horizontally extending rotational axis in a mounted position of the drawer pull-out guide, the rotational axes of the at least two rolling bodies are arranged in the same running plane, and the at least two rolling bodies have the same diameter.

21 Claims, 5 Drawing Sheets

(56) References Cited

U.S. PATENT DOCUMENTS

| | | | |
|---|---|---|---|
| 4,955,160 A | 9/1990 | Röck | |
| 6,347,849 B1 | 2/2002 | Möterthies et al. | |
| 6,682,160 B2 | 1/2004 | Kung | |
| 6,932,200 B2 | 8/2005 | Booker et al. | |
| 7,320,508 B2 | 1/2008 | Booker et al. | |
| 7,549,712 B2 | 6/2009 | Booker et al. | |
| 7,845,744 B2 | 12/2010 | Chen et al. | |
| 8,678,529 B2 * | 3/2014 | Li | A47B 88/40 312/334.6 |
| 9,204,722 B2 | 12/2015 | Violand et al. | |
| 9,894,992 B2 | 2/2018 | Berchtold et al. | |
| 2003/0197452 A1 | 10/2003 | Kung | |
| 2004/0227280 A1 | 11/2004 | Booker et al. | |
| 2004/0227440 A1 | 11/2004 | Booker et al. | |
| 2004/0227444 A1 | 11/2004 | Booker et al. | |
| 2008/0284299 A1 | 11/2008 | Chen et al. | |
| 2009/0232426 A1 * | 9/2009 | Hammerle | A47B 88/493 384/18 |
| 2012/0248956 A1 * | 10/2012 | Netzer | A47B 88/493 312/334.9 |
| 2014/0009054 A1 * | 1/2014 | Salice | A47B 88/477 312/334.44 |
| 2014/0241651 A1 * | 8/2014 | Greussing | A47B 88/487 384/19 |
| 2015/0230604 A1 | 8/2015 | Violand et al. | |
| 2016/0235199 A1 * | 8/2016 | Liang | A47B 88/493 |
| 2016/0316911 A1 | 11/2016 | Berchtold et al. | |
| 2017/0172300 A1 * | 6/2017 | Bowman | A47B 88/487 |

FOREIGN PATENT DOCUMENTS

| | | |
|---|---|---|
| CN | 103479104 | 1/2014 |
| CN | 104780809 | 7/2015 |
| DE | 30 26 544 | 2/1981 |
| DE | 20 2007 011 533 | 12/2007 |
| DE | 20 2008 012 996 | 3/2010 |
| DE | 20 2014 009 194 | 12/2014 |
| EP | 0 363 583 | 4/1990 |
| EP | 0 439 774 | 8/1994 |
| EP | 1 066 773 | 1/2001 |
| EP | 3 096 649 B1 | 7/2017 |
| GB | 2 168 597 | 6/1986 |
| GB | 2 453 326 | 4/2009 |
| JP | 61-146208 A | 7/1986 |
| JP | 2-114909 | 4/1990 |
| JP | 2017-503592 A | 2/2017 |
| TW | 201300048 | 1/2013 |
| WO | 2007/108601 | 9/2007 |
| WO | 2013/010139 | 1/2013 |

OTHER PUBLICATIONS

International Search Report dated Sep. 26, 2018 in International (PCT) Application No. PCT/AT2018/060153.

* cited by examiner

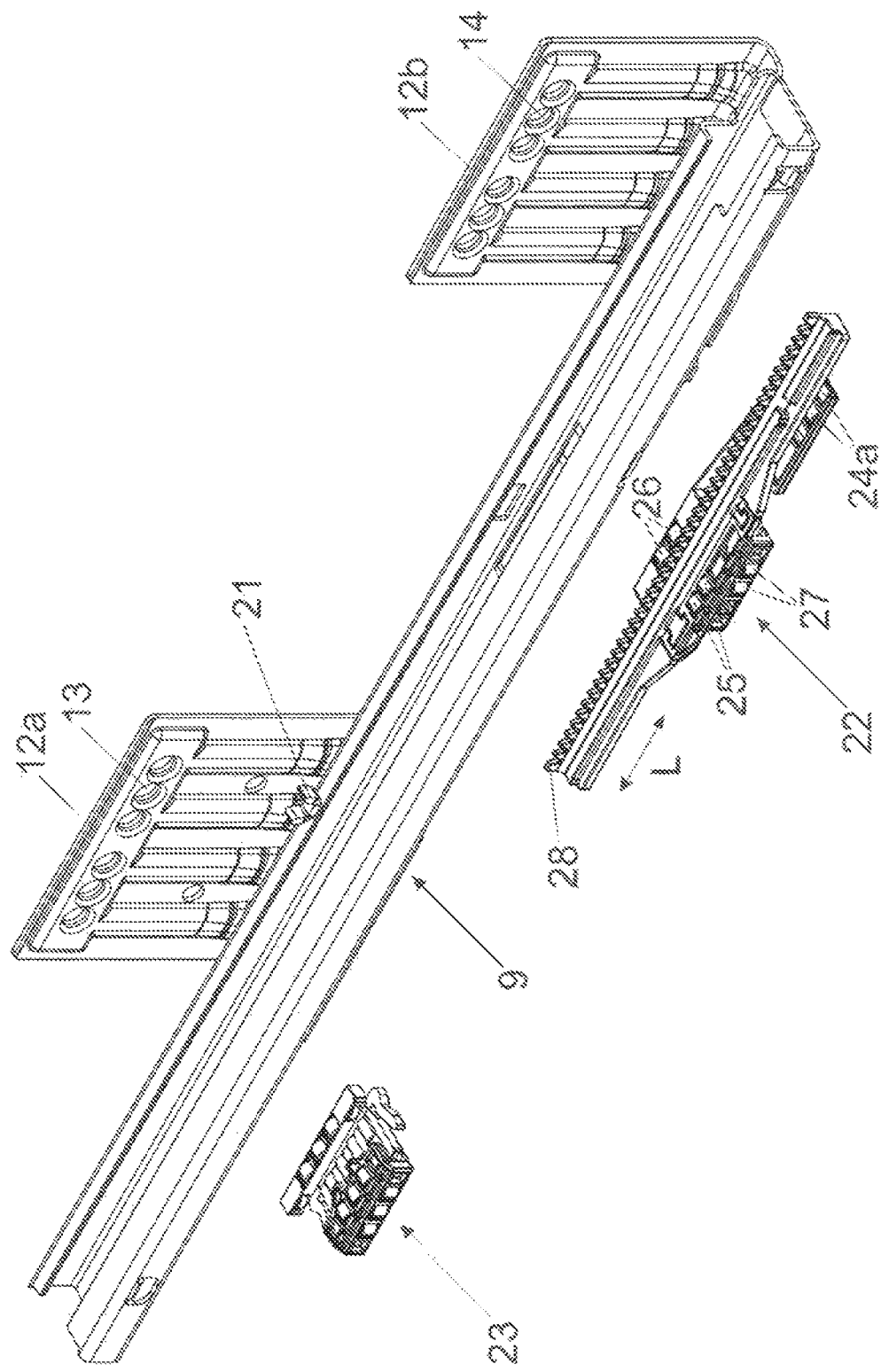

DRAWER PULL-OUT GUIDE

BACKGROUND OF THE INVENTION

The present invention relates to a drawer pull-out guide which includes a first guide rail and at least one second guide rail displaceably supported relative to one another. At least one running carriage has load-transmitting rolling bodies, and the at least one running carriage is displaceably arranged between the first guide rail and the at least one second guide rail. The at least one running carriage includes at least two rolling bodies rotatable about a rotational axis, and the at least two rolling bodies—in a view onto a plane perpendicular to a longitudinal direction of the guide rails—are arranged so as to be laterally offset to one another. Each of the at least two rolling bodies has a cylindrical form and is rotationally supported about a horizontally extending rotational axis in a mounted position of the drawer pull-out guide.

With drawer pull-out guides, running carriages are utilized for transmitting a load of the drawer, and the running carriages enable a low-frictional and precise translation of the guide rails to one another. These running carriages (or cages of running carriages) include rolling bodies (for example in the form of cylinders, balls or cones) configured to run along running limbs provided on the guide rails, so that the guide rails can be supported relative to one another.

WO 2007/108601 A1 and DE 20 2014 009 194 U1 disclose non-generic drawer pull-out guides, in which the load-transmitting rolling bodies are configured as balls which are arranged in a common running carriage. These ball guides have the drawback that the useable width of the balls, due to their spherical surface, is only used to an extent of approximately 70%, i.e. approximately 30% of a width of the balls waste constructional space and increase the weight. Moreover, the contact surface of the balls to the guide rails is only configured so as to be "punctiform", and this point contact—besides a small supporting surface—also leads to a high surface pressure and, therefore, to undesired deformations of the balls.

GB 2 453 326 A discloses an extension guide for drawers, in which in a running carriage arranged between the central rail and the extension rail, two rolling bodies in the form of cylindrical rollers are arranged so as to be spaced from each other in a lateral direction. The cylindrical rollers have a vertically extending rotational axis in the mounted position and are therefore not configured as rolling bodies for transmitting a load of the drawer.

DE 30 26 544 A1 discloses a drawer pull-out guide having a carcass rail, a central rail and a drawer rail. Between each of these rails, displaceable running carriages with load-transmitting rolling bodies are arranged. The movements of the two running carriages are synchronized to one another by a pinion. According to FIG. 8, the rolling bodies of the running carriages, in a view onto a plane perpendicular to a longitudinal direction of the drawer pull-out guide, are arranged so as to be laterally offset to one another.

SUMMARY OF THE INVENTION

It is an object of the present invention to propose a drawer pull-out guide of the type mentioned in the introductory part, having a stable and compact construction of the running carriage.

According to the invention, the rotational axes of the at least two rolling bodies can be arranged in a same running plane, and that the at least two rolling bodies each have a same diameter.

This is, in view of the previously mentioned WO 2007/108601 A1 and DE 20 2014 009 194 U1, not an obvious measure, because the drawer pull-out guides and running carriages shown in these references would have to be considerably modified for the use with cylindrical rollers having horizontally extending rotational axes.

In this way, lateral tilting moments, which are exerted due to a load of the drawer onto the guide rails, can be transmitted via the laterally offset rolling bodies in an improved manner and can therewith be optimally absorbed.

A further advantage lies in the fact that, instead of rolling bodies having a considerable width, at least two rolling bodies which are laterally spaced from one another can be utilized. In this way, the production of the running carriage can be simplified, because the running carriage can be equipped with standard rolling bodies having only a single predetermined width and/or a single predetermined diameter. In this way, if appropriate, an assembly of the running carriage with rolling bodies having a different width and/or having different sizes can be omitted.

Besides a stable and compact construction, the danger of deformations of the rolling bodies can be reduced, because the occurring forces can be distributed over a larger area due to the arrangement of the at least two rolling bodies being arranged laterally offset to one another in a same running plane. Therefore, each single rolling body is only subjected to a reduced load.

According to an embodiment, the at least two rolling bodies of the running carriage can be spaced from each other in a direction extending in a longitudinal direction of the guide rails.

According to the invention each of the at least two rolling bodies is rotationally supported about a horizontally extending rotational axis in the mounted position, and each of the at least two rolling bodies has a cylindrical form.

With a possible embodiment, the running carriage can include at least three or more rolling bodies, and each of the three or more rolling bodies is rotationally supported about a rotational axis. At least two rotational axes of the three or more rolling bodies are arranged in a first running plane and the other rotational axes of the three or more rolling bodies are arranged in a running plane or in running planes separate from the first running plane.

BRIEF DESCRIPTION OF THE DRAWINGS

Further details and advantages of the present invention will be explained with the aid of the following description of figures, in which:

FIG. 3 shows a perspective view of the first guide rail to be fixed to the furniture carcass together with two running carriages separate from one another.

DETAILED DESCRIPTION OF THE INVENTION

Figure 1:
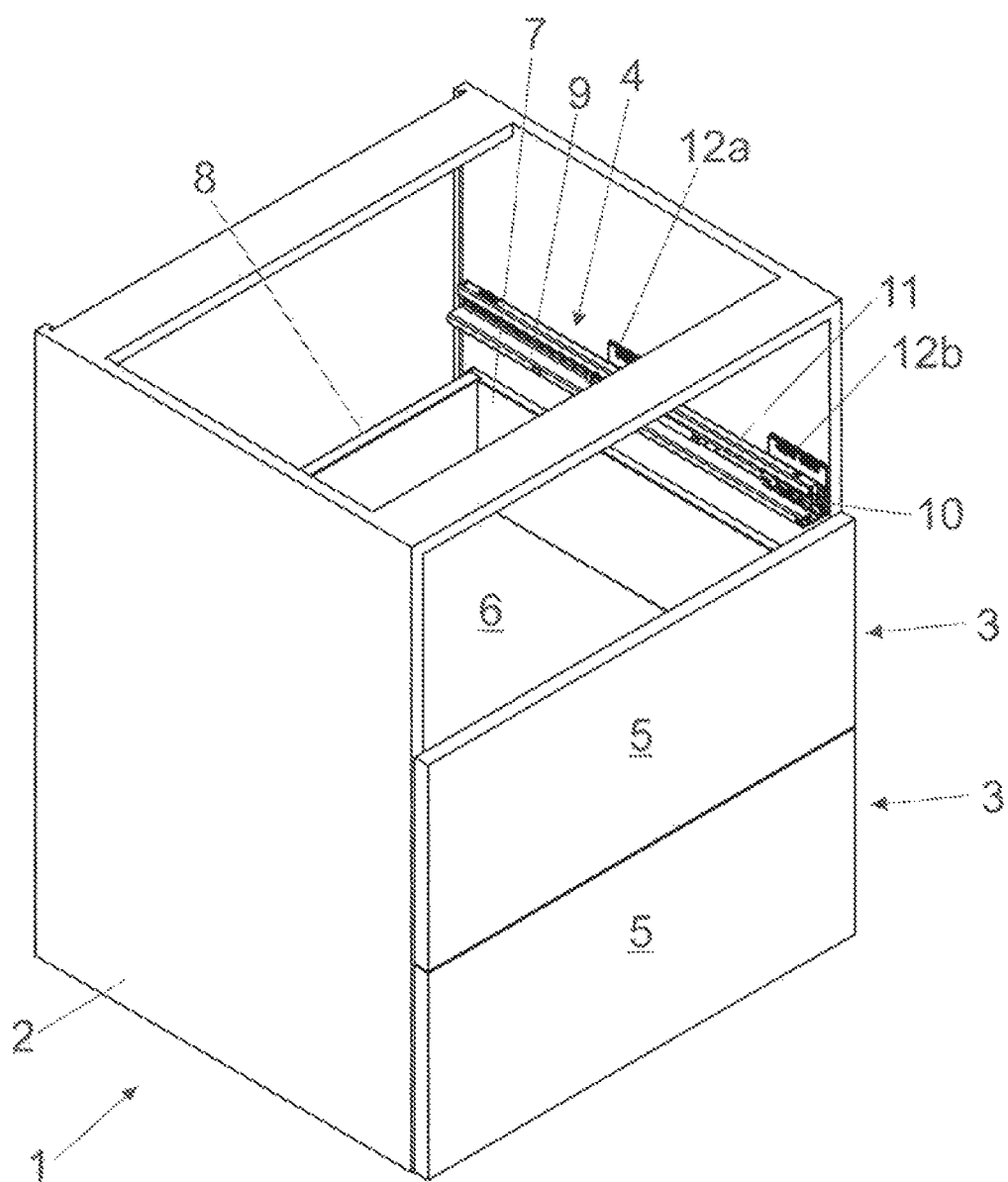
FIG. 1 shows a perspective view of an item of furniture having drawers displaceably supported relative to a furniture carcass by drawer pull-out guides.

FIG. 1 shows an item of furniture 1 having a cupboard-shaped furniture carcass 2, and drawers 3 are displaceably supported relative to the furniture carcass 2 by drawer pull-out guides 4. Each of the drawers 3 includes a front panel 5, a drawer bottom 6, drawer sidewalls 7 and a rear wall 8. Each of the drawer pull-out guides 4 includes a first guide rail 9 configured to be fixed to the furniture carcass 2 by fastening sections 12a, 12b, and at least one second guide rail 10 configured to be displaceable relative to the first guide rail 9. In the shown embodiment, a third guide rail 11 to be fixed to the drawer 3 is further provided, and the second guide rail 10 in the function of a central rail for increasing an extension is displaceable between the stationary first guide rail 9 and the third guide rail 11.

Figure 2:
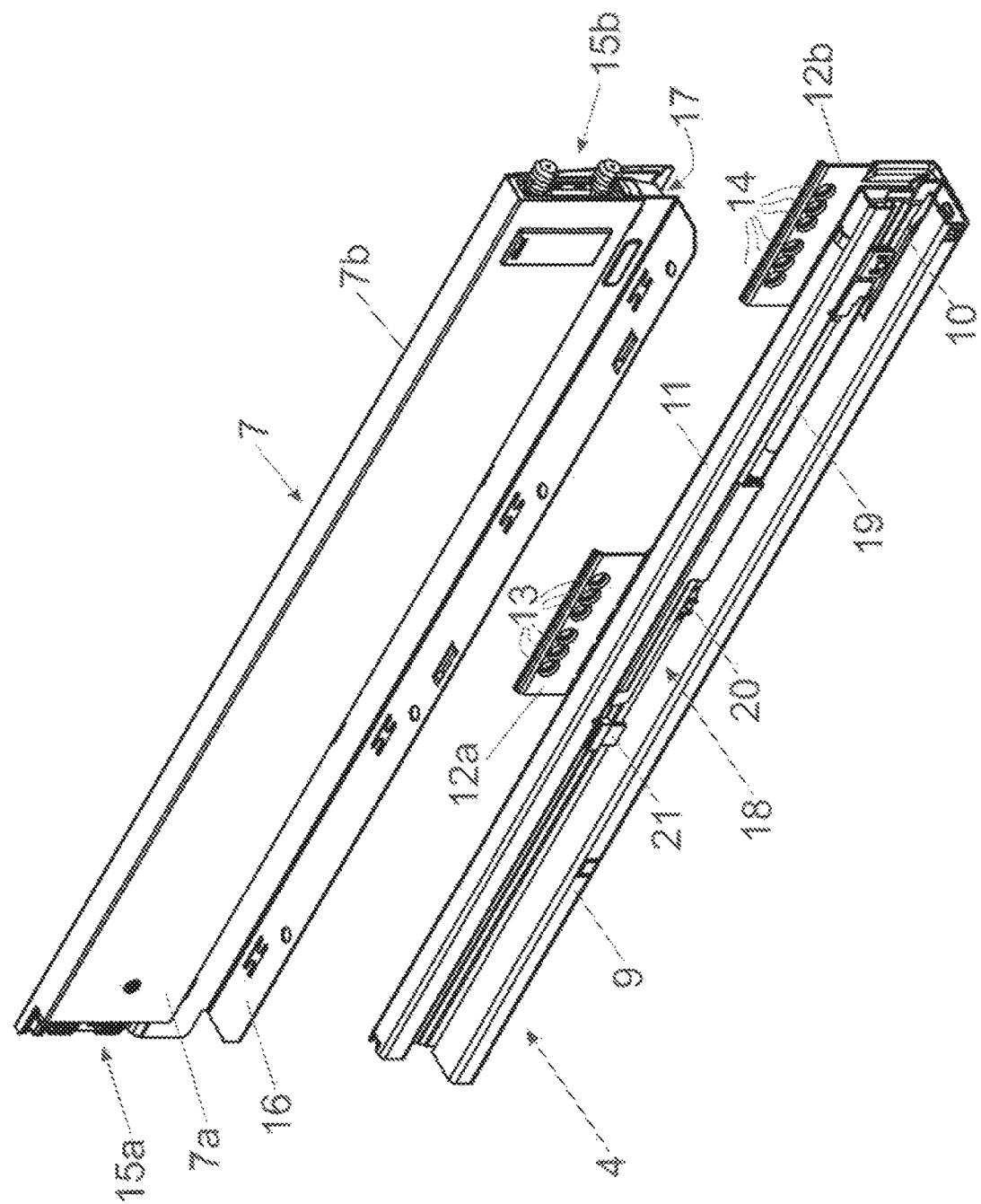
FIG. 2 shows a drawer pull-out guide configured to be connected to a drawer sidewall.

FIG. 2 shows an arrangement with a drawer pull-out guide 4 and a drawer sidewall 7 in a perspective view. Each of the fastening sections 12a, 12b of the first guide rail 9 includes one or a plurality of fastening locations 13, 14 for fixing to the furniture carcass 2. The third guide rail 11 is connected or is configured to be releasably connected to the drawer sidewall 7, and the second guide rail 10 is displaceable between the first guide rail 9 and the third guide rail 11. A coupling element 21 is arranged on the first guide rail 9, the coupling element 21 being configured to be releasably coupled to an entrainment member 20 of a retraction device 18 arranged on the third guide rail 11. Therefore, the third guide rail 11, at the end of the closing movement, can be engaged by the entrainment member 20 and can be retracted into a closed end position by a force storage member of the retraction device 18. By a damping device 19, preferably having a hydraulic piston-cylinder-unit, this spring-assisted retraction movement of the third guide rail 11 can be dampened until reaching the closed end position.

The drawer sidewall 7 is configured as a hollow-chamber profile having an inner profiled wall 7a and an outer profiled wall 7b spaced therefrom. The drawer sidewall 7 has a channel 17 configured so as to be open to the bottom and extending in a longitudinal direction of the drawer sidewall 17, and the third guide rail 11 of the drawer pull-out guide 4 can be arranged in the channel 17. The drawer sidewall 7 further includes a first fastening device 15a configured to be connected to the rear wall 8, a second fastening device 15b configured to be connected to the front panel 5, and a support portion 16 for supporting the drawer bottom 6.

FIG. 3 shows the first guide rail 9 with the fastening sections 12a, 12b to be fixed to the furniture carcass 2. The first guide rail 9, in a cross-section, includes a U-shaped or a C-shaped section, in which a running carriage 22 and further running carriage 23 separate from the running carriage 22, for guiding and supporting the second guide rail 10, are displaceably supported. The running carriage 22 and the further running carriage 23 are displaceably supported in a common running plane. The running carriage 22 includes load-transmitting rolling bodies 24a, 24b, 25, 26, and the rotational axes of which are spaced in a height direction from one another. Accordingly, the rotational axes of the load-transmitting rolling bodies 24a, 24b, 25, 26 are arranged in running planes A, B, C (see FIG. 5a, FIG. 5b) separate from one another. The running carriage 22 further includes lateral supporting rollers 27, the supporting rollers 27 having rotational axes extending vertically in the mounted position. The lateral supporting rollers 27, on the one hand, are configured to run along a vertical limb of the first guide rail 9, the vertical limb extending in the longitudinal direction (L). On the other hand, the supporting rollers 27 are configured to run along a vertically extending limb 10c (see FIG. 5a, FIG. 5b) of the second guide rail 10. By a tooth arrangement 28 arranged or formed on the running carriage 22, a movement of the running carriage 22 can be synchronized, via a pinion, with a movement of a further running carriage which is displaceably arranged between the second guide rail 10 and the third guide rail 11.

Figure 4A:
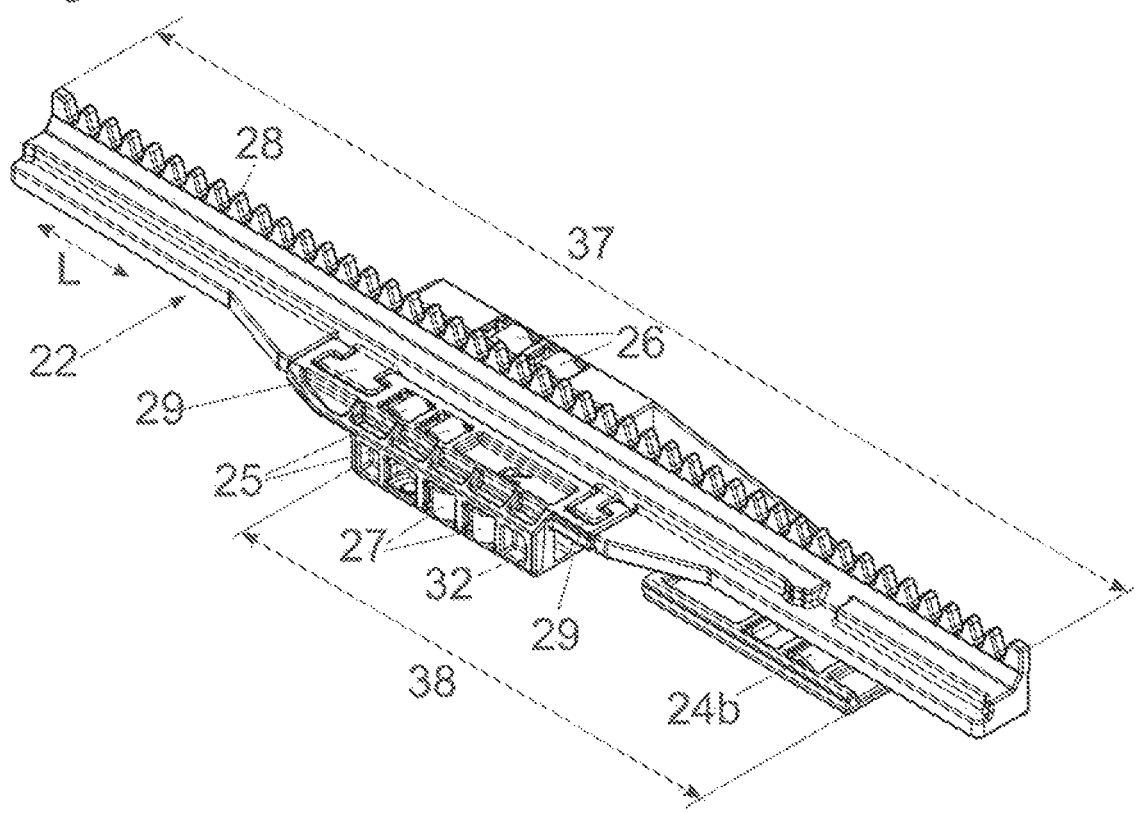
FIG. 4a, 4b shows a running carriage having a tooth arrangement and a cage of the running carriage in perspective views.

FIG. 4a shows the running carriage 22 in a perspective view. The running carriage 22 includes a cage 32 in which the load-transmitting rolling bodies 24a, 24b, 25, 26 and the lateral supporting rollers 27, 31 are arranged so as to be stationary relative to the cage 32 in a direction extending in a longitudinal direction (L) of the running carriage 22. The tooth arrangement 28, together with the cage 32, can have a one-piece configuration, or—as shown in the figure—can be releasably fixed to the cage 32. For this purpose, the tooth arrangement 28 has, preferably T-shaped and/or L-shaped, tabs 29 spaced from each other in the longitudinal direction (L), and the tabs 29, in the mounted position of the tooth arrangement 28, engage into corresponding recesses 30 (see FIG. 4b) of the cage 32 in a form-locking manner. Each of the rolling bodies 24a, 24b, 25, 26 arranged in different running planes A, B, C is rotationally supported about a horizontally extending rotational axis.

Figure 4B:
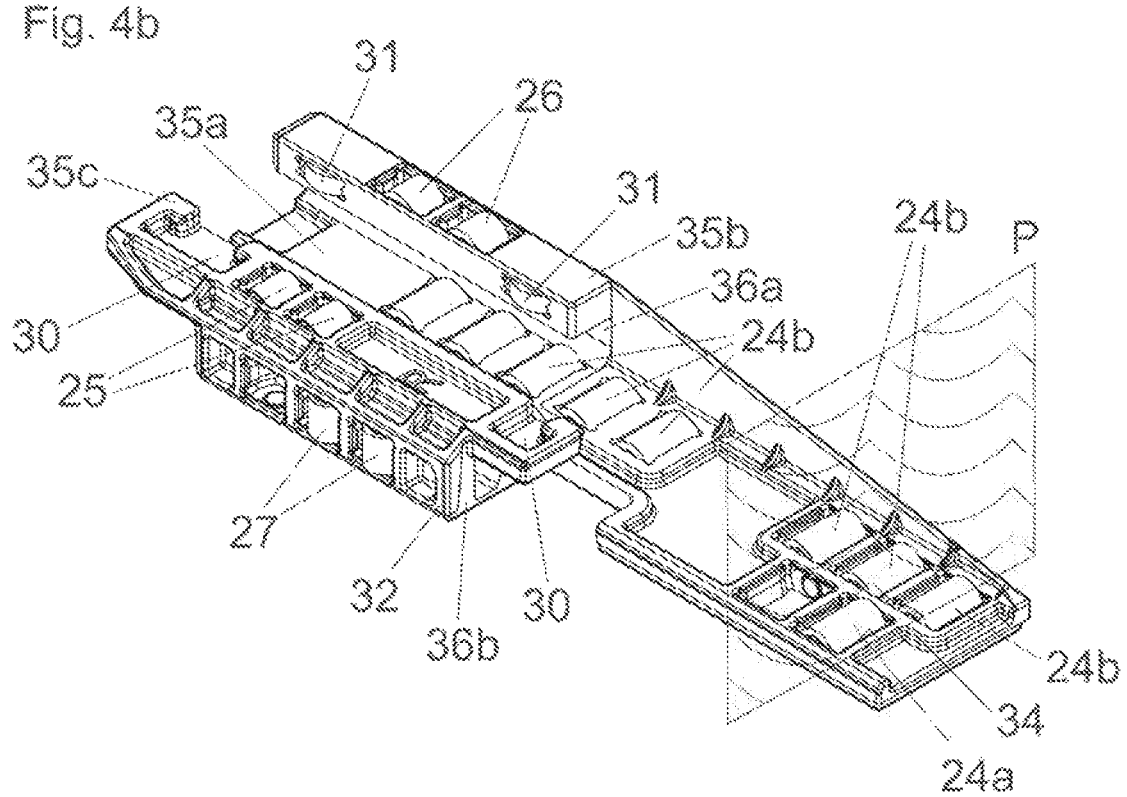

FIG. 4b shows the cage 32 of the running carriage 22, in which the recesses 30 for releasably receiving the tabs 29 of the tooth arrangement 28 are clearly visible. The first and second rolling bodies 24a, 24b are arranged in a first running plane (A), the third rolling bodies 25 are arranged in a second running plane (B), and the fourth rolling bodies 26 are arranged in a third running plane (C). The first running plane (A), the second running plane (B) and the third running plane (C) are spaced from one another in a height direction in the mounted position of the drawer pull-out guide 4 on the furniture carcass 2. The rolling bodies 24a, 24b, 25 and 26 can be arranged so as to be spaced from one another in a direction extending in the longitudinal direction (L). At least the rolling bodies 24a, 24b, preferably all rolling bodies 24a, 24b, 25, 26, have a cylindrical form. Moreover, it is also possible that each of the first, second and third rolling bodies 24a, 24b, 25 and 26 has a different diameter. A diameter of the rolling bodies 24a, 24b can be dimensioned between 3,8 mm and 4,2 mm, a diameter of the rolling bodies 25 can be dimensioned between 2,8 mm and 3,3 mm, and a diameter of the rolling bodies 26 can be dimensioned between 4,0 mm and 4,5 mm. It may also be provided that the rolling bodies 24a, 24b of the rolling bodies 24a, 24b, 25 and 26, which are supported on a front-end of the running carriage 22, have a diameter being less than a diameter of the other rolling bodies 25, 26. The at least two rolling bodies 24a, 24b of the running carriage 22 are, preferably exclusively, spaced from one another in a lateral direction by a portion of the cage 32, preferably by at least one limb 34 of the cage 32, the limb 34 extending at least over a region in the longitudinal direction (L). Exemplary depicted is a plane (P) extending perpendicular to a longitudinal direction (L) of the guide rails 9, 10, and the rolling bodies 24a, 24b, in a view onto that plane (P), are arranged so as to be laterally offset to one another.

According to an embodiment, it can be provided that the at least one running carriage 22 includes three limbs 35a, 35b, 35c aligned substantially horizontally in the mounted position, and at least one rolling body 24b, 25, 26 is supported on each of the limbs 34a, 34b, 34c. Preferably, it can be provided that the rolling bodies 24b, 25, 26 are passed through the limbs 35a, 35b, 35c. In the shown figure, the limbs 35a, 35b, 35c are connected to one another by two connecting limbs 36a, 36b aligned substantially vertically in the mounted position. It is preferably provided that at least one of the connecting limbs 36a, 36b includes at least one lateral supporting roller 31. Preferably, the supporting roller 31 is passed through that connecting limb 36a, 36b.

One of the limbs 35a, 35b, 35c extending substantially horizontally in the mounted position can extend substantially over an entire width of at least one of the guide rails 9, 10. It is preferably provided that the limb 35a adopts a lowest position relative to the two other limbs 35b, 35c. One of the limbs 35a, 35b, 35c extending substantially horizontally in the mounted position can have a width being substantially double than a width of at least one of the other two limbs 35b, 35c.

The at least one running carriage 22, in a cross-section, can have a substantially U-shaped or a substantially C-shaped configuration.

As can be seen from FIG. 4a, the at least one running carriage 22 can have a length 37, and the region 38 in which the rolling bodies 24a, 24b, 25, 26 of the running carriage 22 are arranged, only extends over a part of the length 37 of the at least one running carriage 22.

Figure 5:
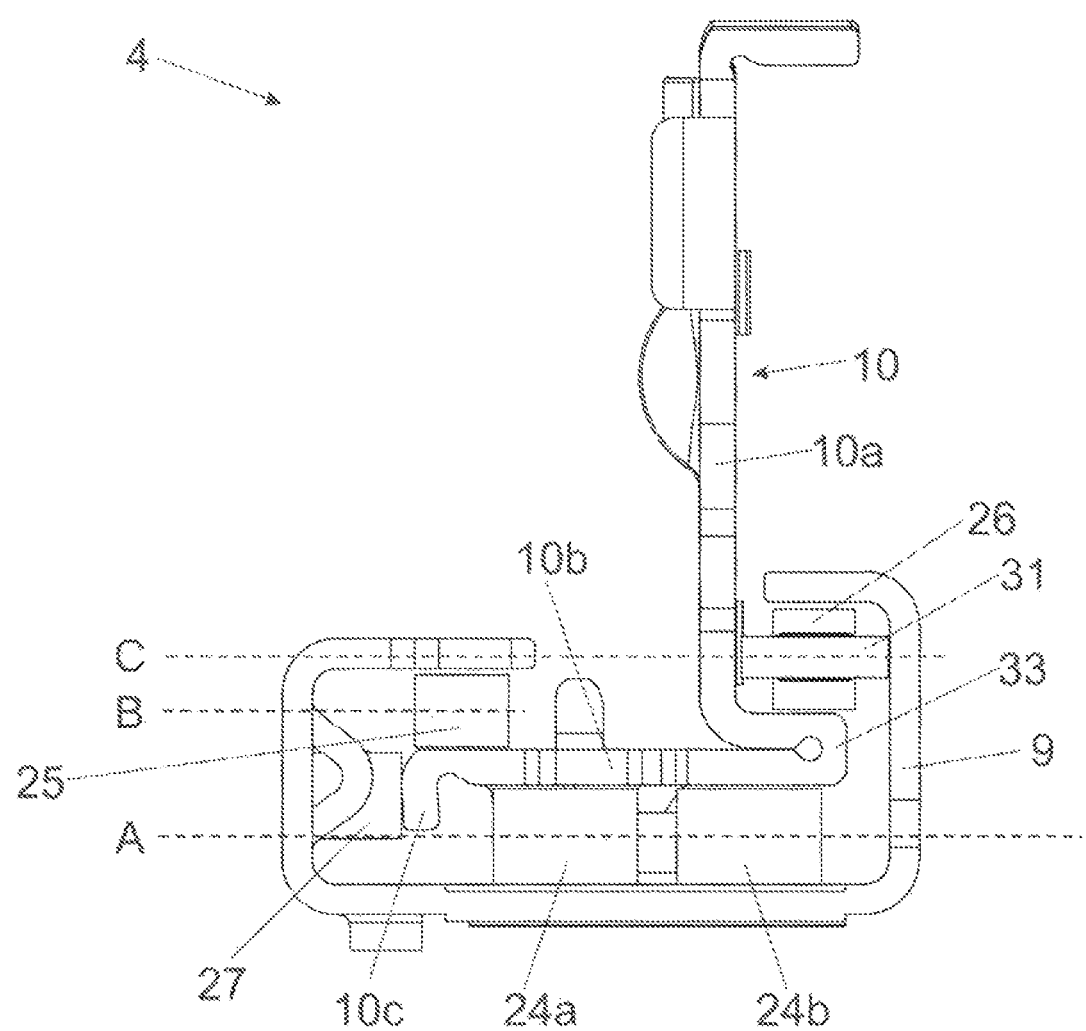
FIG. 5 shows a perspective view of possible embodiment of an arrangement of the rolling bodies of the running carriage.

FIG. 5a shows a cross-sectional view of the first guide rail 9 and the second guide rail 10 configured to be displaceable thereto. The cage 32 of the running carriage 22 is hidden for the sake of improved overview. The second guide rail 10 includes a, preferably vertical, side limb 10a and a, preferably horizontal, transverse limb 10b, the transverse limb 10b being connected to the side limb 10a by a rabbet 33. The at least two rolling bodies 24a, 24b are configured to run along a running limb of the first guide rail 9 in the longitudinal direction (L). The third rolling bodies 25 are configured to roll along the transverse limb 10b and the fourth rolling bodies 26 are configured to roll along the rabbet 33 of the second guide rail 10. In the shown embodiment, the at least two rolling bodies 24a, 24b, at least one third rolling body 25 and at least one fourth rolling body 26 are each displaceably arranged in running planes (A, B, C) separate from one another. Visible is a lateral supporting roller 31 of the running carriage 22, the lateral supporting roller 31 having a vertically extending rotational axis and being configured to run between the first guide rail 9 and the vertically extending side limb 10a of the second guide rail 10. Each of the rolling bodies 24a, 24b, 25 and 26 is rotationally supported about a horizontally extending rotational axis, and each of the axes of the rolling bodies 24a, 24b, 25, 26 are arranged in three running planes A, B, C lying above one another.

An improved support for compensating for lateral tilting moments is then provided, if the rolling bodies 24a, 24b, 25, 26—in a view onto a plane (P) extending perpendicular to the longitudinal direction (L) of the guide rails 9, 10—are arranged so as to be laterally offset from one another. Moreover, it can be provided that the first and second rolling bodies 24a, 24b, in a view onto a plane (P) extending perpendicular to the longitudinal direction (L) of the guide rails 9, 10—adopts a lowest position relative to a third rolling body 25 and to a fourth rolling body 26, the third rolling body 25 and the fourth rolling body 26 being entirely arranged above the first and second rolling bodies 24a, 24b. In the Figure, it is moreover shown that the third and fourth rolling bodies 25, 26—in a view onto a plane (P) extending perpendicular to the longitudinal direction (L) of the guide rails 9, 10—are only partially arranged above one another. The transverse limb 10b of the second guide rail 10 is connected to a vertically extending limb 10c, and the lateral supporting rollers 27 having vertical rotational axes are configured to run between the first guide rail 9 and the vertically extending limb 10c of the second guide rail 10.

With all embodiments, it can be provided that the first and second rolling body 24a, 24b belong to a first group of rolling bodies, the third rolling body 25 belongs to a second group of rolling bodies, and the fourth rolling body 26 belongs to a third group of rolling bodies. Each of the first, second and third group of rolling bodies includes a plurality of rolling bodies 24a, 24b, 25, 26 which are arranged in a same running plane A, B, C. Moreover, it can be provided that the rolling bodies 24a, 24b, 25, 26, which are arranged in a same running plane A, B, C, are spaced from one another in a longitudinal direction (L) of the running carriage 22 and/or are arranged so as to be laterally offset relative to one another.

The invention claimed is:

1. A drawer pull-out guide, comprising:
   a first guide rail and at least one second guide rail displaceably supported relative to one another; and
   at least one running carriage having load-transmitting rolling bodies, the at least one running carriage being displaceably arranged between the first guide rail and the at least one second guide rail, wherein the at least one running carriage includes at least four rolling bodies, each of the at least four rolling bodies being rotatably supported about a respective rotational axis,
   wherein the at least four rolling bodies, in a view onto a plane perpendicular to a longitudinal direction of the guide rails, are arranged so as to be laterally offset to one another,
   wherein each of the at least four rolling bodies has a cylindrical form and is rotationally supported such that its rotational axis extends horizontally in a mounted position of the drawer pull-out guide,
   wherein at least two rotational axes of the at least four rolling bodies are arranged in a same first running plane, a third rotational axis of the at least four rolling bodies is arranged in a second running plane, and a fourth rotational axis of the at least four rolling bodies is arranged in a third running plane,
   and wherein the rolling bodies corresponding to the at least two rotational axes arranged in the same first running plane each have a same diameter.

2. The drawer pull-out guide according to claim 1, wherein the at least one running carriage includes a cage for supporting the at least four rolling bodies, wherein the at least two four rolling bodies are spaced from each other in a lateral direction by a portion of the cage.

3. The drawer pull-out guide according to claim 2, wherein the rolling bodies corresponding to the at least two rotational axes arranged in the same first running plane are spaced from each other in the lateral direction by at least one limb of the cage.

4. The drawer pull-out guide according to claim 1, wherein the at least four rolling bodies of the at least one running carriage are spaced from each other along a direction extending in the longitudinal direction of the guide rails.

5. The drawer pull-out guide according to claim 1, wherein each of the at least four rolling bodies, in relation to the at least one running carriage, is arranged so as to be stationary in a longitudinal direction of the at least one running carriage.

6. The drawer pull-out guide according to claim 1, wherein at least two of the at least four rolling bodies, in a view onto the plane perpendicular to the longitudinal direction of the guide rails, adopt a lowest position relative to third and fourth rolling bodies of the at least four rolling bodies, and the third rolling body and the fourth rolling body are entirely arranged above the at least two rolling bodies.

7. The drawer pull-out guide according to claim 1, wherein at least one of the at least four rolling bodies, in a view onto the plane perpendicular to the longitudinal direction of the guide rails is arranged only partially above another of the at least four rolling bodies.

8. The drawer pull-out guide according to claim 7, wherein the rolling bodies corresponding to the at least two rotational axes arranged in the same first running plane are arranged on a front-end region of the at least one running carriage, and have a diameter being less than a diameter of each of third and fourth rolling bodies of the at least four rolling bodies.

9. The drawer pull-out guide according to claim 1, wherein the rolling bodies corresponding to the at least two rotational axes arranged in the same first running plane belong to a first group of rolling bodies, the first group of rolling bodies including a plurality of rolling bodies arranged in the first running plane,
wherein a third rolling body of the at least four rolling bodies belongs to a second group of rolling bodies, the second group of rolling bodies including a plurality of rolling bodies arranged in the second running plane,
and wherein a fourth rolling body of the at least four rolling bodies belongs to a third group of rolling bodies, the third group of rolling bodies including a plurality of rolling bodies arranged in the third running plane.

10. The drawer pull-out guide according to claim 1, further comprising a third guide rail to be fixed to a drawer, wherein the first guide rail is to be fixed to a furniture carcass and wherein the second guide rail is displaceably supported between the first guide rail and the third guide rail.

11. The drawer pull-out guide according to claim 1, wherein the at least one running carriage includes three limbs aligned substantially horizontally in the mounted position, and three of the at least four rolling bodies are supported on the three limbs, respectively.

12. The drawer pull-out guide according to claim 11, wherein the limbs are connected to one another by two connecting limbs aligned substantially vertically in the mounted position.

13. The drawer pull-out guide according to claim 12, wherein at least one of the connecting limbs includes at least one lateral supporting roller.

14. The drawer pull-out guide according to claim 13, wherein the at least one lateral supporting roller is passed through the at least one of the connecting limbs.

15. The drawer pull-out guide according to claim 11, wherein one of the three limbs aligned substantially horizontally in the mounted position extends substantially over an entire width of at least one of the guide rails.

16. The drawer pull-out guide according to claim 15, wherein the one of the three limbs adopts a lowest position in relation to the other of the three limbs.

17. The drawer pull-out guide according to claim 11, wherein one of the three limbs aligned substantially horizontally in the mounted position has a width which is substantially twice as wide as another of the three limbs.

18. The drawer pull-out guide according to claim 11, wherein the three of the at least four rolling bodies are passed through the limbs.

19. The drawer pull-out guide according to claim 1, wherein the at least one running carriage, in a cross-section, has a substantially U-shaped or a substantially C-shaped configuration.

20. The drawer pull-out guide according to claim 1, wherein the at least one running carriage has a length, and a region in which the rolling bodies of the at least one running carriage are arranged only extends over a part of the length of the at least one running carriage.

21. A drawer comprising the drawer pull-out guide according to claim 1 for moving the drawer relative to a furniture carcass.

* * * * *